United States Patent
Savant

(10) Patent No.: US 11,565,329 B1
(45) Date of Patent: Jan. 31, 2023

(54) GAUGE APPARATUS FOR CNC MACHINE AND RELATED METHODS OF USE

(71) Applicant: Kevin D. Savant, Kinder, LA (US)

(72) Inventor: Kevin D. Savant, Kinder, LA (US)

(*) Notice: Subject to any disclaimer, the term of this patent is extended or adjusted under 35 U.S.C. 154(b) by 0 days.

(21) Appl. No.: 17/487,433

(22) Filed: Sep. 28, 2021

(51) Int. Cl.
  *G01B 5/25* (2006.01)
  *B23B 31/10* (2006.01)

(52) U.S. Cl.
  CPC ............ *B23B 31/102* (2013.01); *G01B 5/25* (2013.01)

(58) Field of Classification Search
  CPC ............................. B23B 31/102; G01B 5/25
  See application file for complete search history.

(56) References Cited

U.S. PATENT DOCUMENTS

| | | | |
|---|---|---|---|
| 2,460,254 A | 1/1949 | Greer, Jr. | |
| 2,572,013 A | 10/1951 | Cushman | |
| 3,160,042 A | 12/1964 | Grand | |
| 3,172,674 A | 3/1965 | Lowe | |
| 3,594,960 A | 7/1971 | Fourquier | |
| 3,945,654 A | 3/1976 | McMullen | |
| 4,497,499 A * | 2/1985 | Allen | B23B 31/185 279/119 |
| 4,524,983 A * | 6/1985 | Burnham | B23B 31/1605 279/133 |
| 4,667,971 A | 5/1987 | Norton et al. | |
| 4,846,287 A | 7/1989 | Ericsson | |
| 5,317,814 A * | 6/1994 | Rogier | G01B 5/12 33/542 |
| 6,044,571 A * | 4/2000 | Strait | G01B 5/08 33/832 |
| 10,160,039 B2 * | 12/2018 | Offermann | B23Q 17/2275 |
| 2015/0042051 A1 | 2/2015 | Maurer | |
| 2021/0055090 A1 * | 2/2021 | Trimpe | B23B 5/08 |

FOREIGN PATENT DOCUMENTS

| | | |
|---|---|---|
| CN | 106424797 B | 2/2017 |
| CN | 110815087 A | 2/2021 |
| DE | 3842101 C2 | 5/1993 |

* cited by examiner

*Primary Examiner* — Yaritza Guadalupe-McCall
(74) *Attorney, Agent, or Firm* — Taylor English Duma

(57) ABSTRACT

A gauge apparatus is disclosed herein that positions a jaw within a chuck at a specified radius with respect to an axis of the chuck. The gauge apparatus includes a gauge member having an elongate configuration with a guide surface against which a side of a jaw may be biased. A pin projects forth from the gauge member to receive a tip of the jaw with the side of the jaw biased against the guide surface, in various aspects, and the pin is positionable with respect to the gauge member. An outer guide assembly cooperates mechanically with the gauge member and with a side face of a chuck to orient the gauge member radially with an axis of the chuck to locate the pin radially with respect to the side face in order to position the jaw at a selected radial position with respect to the axis.

8 Claims, 9 Drawing Sheets

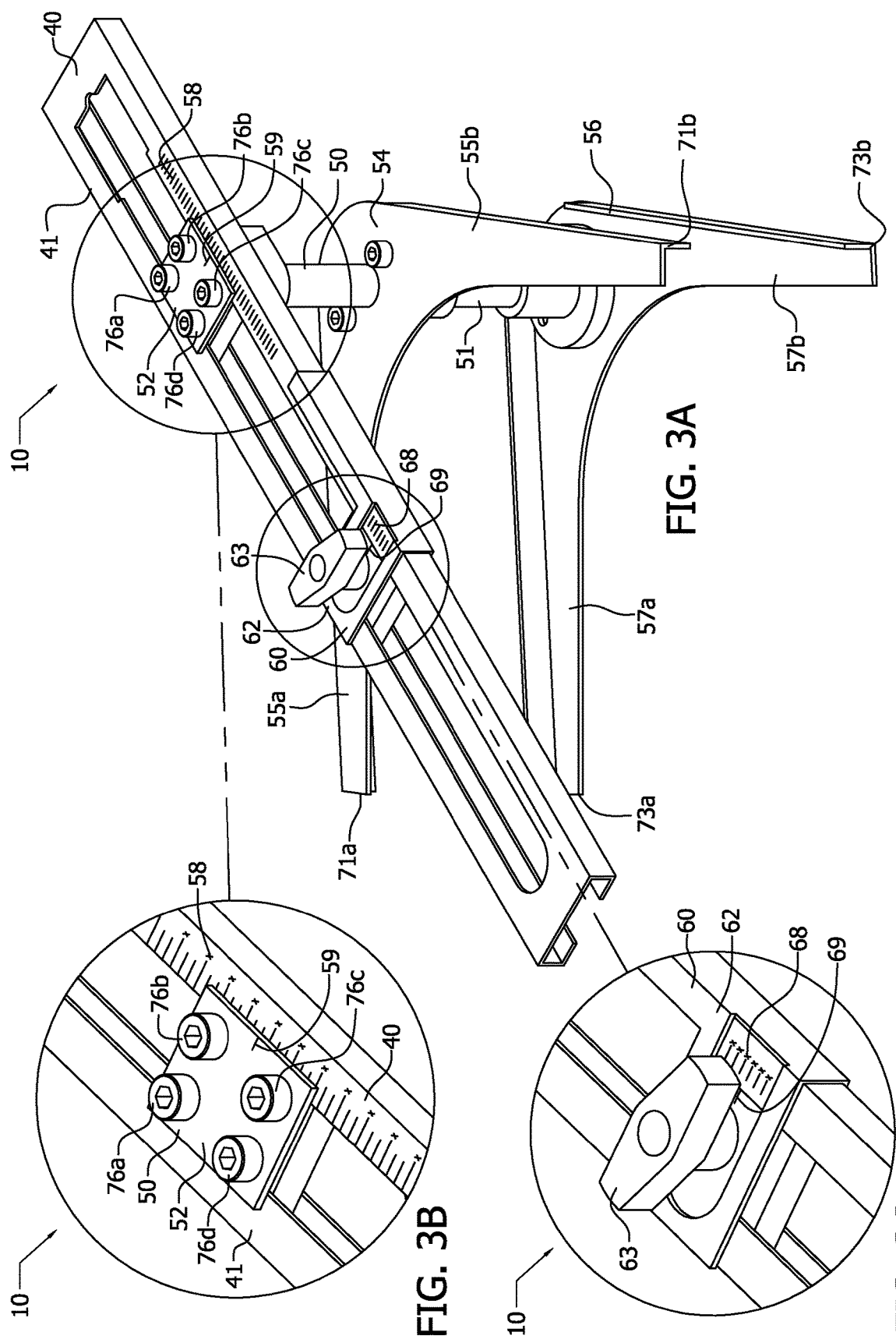

GAUGE APPARATUS FOR CNC MACHINE AND RELATED METHODS OF USE

FIELD OF THE INVENTION

The present invention is directed to tools that facilitate attaching gripping jaws to rotatable chucks, and, more particularly, to a gauge apparatus that facilitates rapid alignment and attachment of jaws to a rotatable chuck in a CNC lathe machine.

BACKGROUND OF THE INVENTION

A computer numerically controlled (CNC) machine tool such as a CNC lathe has a rotatable chuck that holds a workpiece during the machining process. The chuck typically has a plurality of slots arrayed radially around a bore, and each slot has a slot mechanism that grips a jaw that is removably received in the slot. The jaws may be secured within the slots to the slot mechanisms, removed from the slots, and variously positioned within the slots in order to accommodate workpieces of various sizes received in the bore. With the jaws secured in the slots, the slot mechanisms may be hydraulicly or pneumatically actuated to axially position the jaws in order to grip the workpiece during the machining process and to disengage from the workpiece either to allow insertion of portions of the workpiece into the bore for subsequent gripping by the jaws or to release the workpiece from being gripped by the jaws for removal of the workpiece from the chuck.

When attached within the slots to the slot mechanisms, the jaws should be arrayed circumferentially around the bore to center the workpiece when the jaws grip the workpiece. For example, assuming that portions of the workpiece that are inserted into the bore are cylindrical, the jaws should be attached to be evenly positioned radially around an axis of the bore in order to align a workpiece axis of the workpiece with a rotational axis of the chuck when the jaws grip the workpiece. However, securing the jaws in the slots around the bore so that the jaws properly center the workpiece may be difficult to achieve. Various errors in positioning the jaws in the slots during securement of the jaws to the slot mechanisms may occur, the correction of which may add additional time to the machining process or result in errors in machining of the workpiece.

Accordingly, there is a need for improved apparatus as well as related methods that position jaws in a chuck.

BRIEF SUMMARY OF THE INVENTION

These and other needs and disadvantages may be overcome by the apparatus and related methods disclosed herein. Additional improvements and advantages may be recognized by those of ordinary skill in the art upon study of the present disclosure.

A gauge apparatus disclosed herein includes a gauge member having an elongate configuration with a guide surface against which a side of a jaw may be biased. A pin projects forth from the gauge member to receive a tip of the jaw with the side of the jaw biased against the guide surface, in various aspects, and the pin is positionable with respect to the gauge member. An outer guide assembly cooperates mechanically with the gauge member and with a side face of a chuck to orient the gauge member radially with an axis of the chuck to locate the pin radially with respect to the side face in order to position the jaw at a selected radial position with respect to the axis.

The outer guide assembly is positioned with respect to the gauge member based upon radius R of the side face of the chuck using an outer scale disposed upon the gauge member and the pin is positioned to position the jaw radial position $r_j$ using an inner scale disposed upon the gauge member. Positioning the outer guide assembly based upon radius R ensures that the inner scale denotes the selected radial position $r_j$ with respect to the axis. The inner scale gives radial position $r_j$ with respect to the axis when the outer guide assembly is positioned based upon radius R of the side face using the outer scale.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

BRIEF DESCRIPTION OF THE DRAWINGS

FIG. 3A illustrates by perspective view portions of the exemplary gauge apparatus of FIG. 1 including an exemplary gauge assembly;

FIG. 3B illustrates by perspective view portions of the exemplary gauge assembly of FIG. 3A;

FIG. 3C illustrates by perspective view portions of the exemplary gauge assembly of FIG. 3A;

Figure 1:
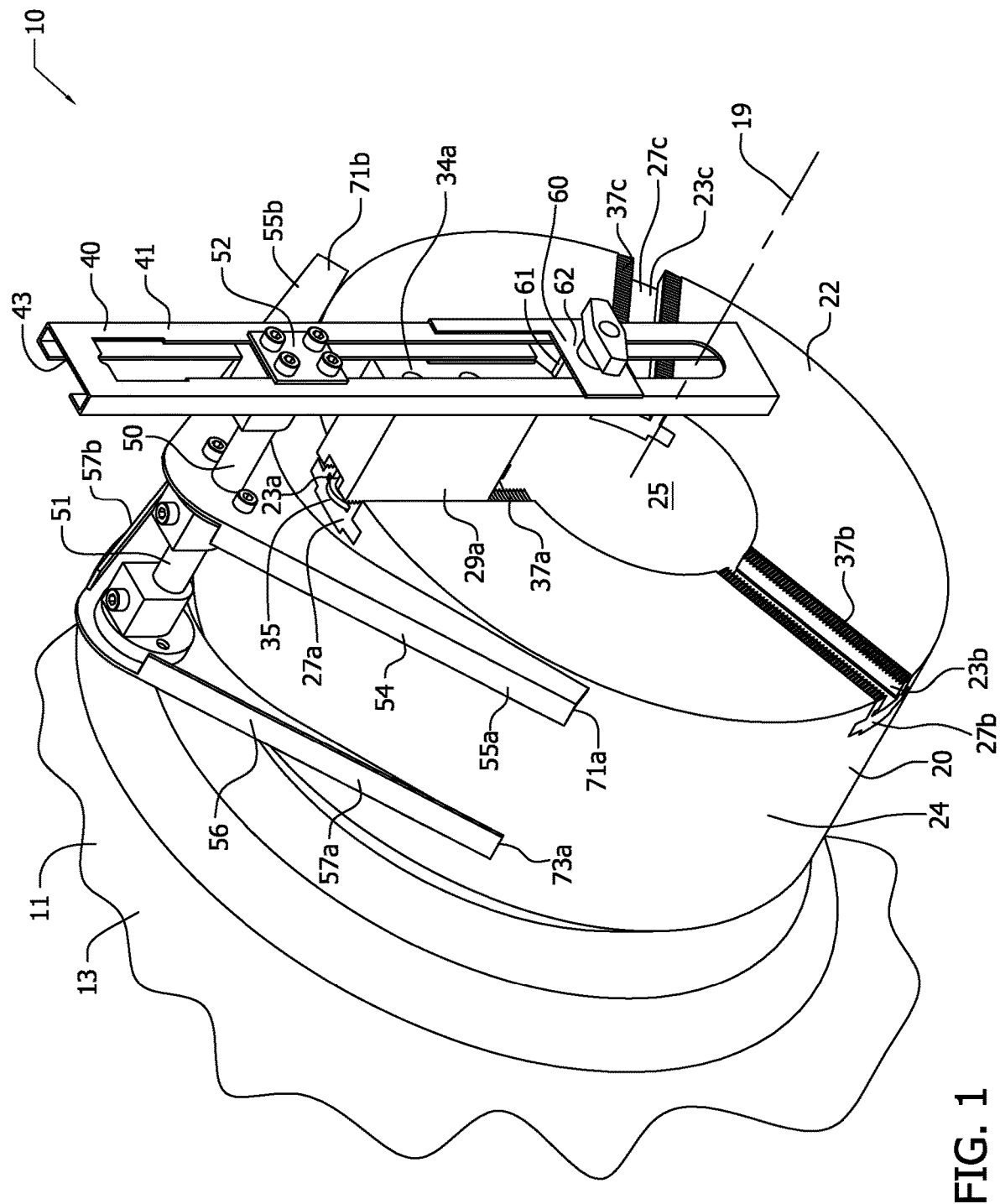
FIG. 1 illustrates by perspective view an exemplary implementation of a gauge apparatus according to the present inventions, the gauge apparatus including a rotatable chuck, gripping jaws, and a gauge assembly.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

A gauge apparatus is disclosed herein that includes a gauge member having an elongate configuration. A pin projects forth from the gauge member to receive a tip of a jaw with the side of the jaw biased against a guide surface of the gauge member and portions of the jaw slidably received in a slot of a chuck, the slot being oriented radially with respect to an axis of the chuck, in various aspects. The pin is adjustably positionable along the gauge member in reference to the side face of the chuck to position the tip of the jaw when received by the pin at a selected radial position in the slot with respect to the axis of the chuck.

Figure 2A:
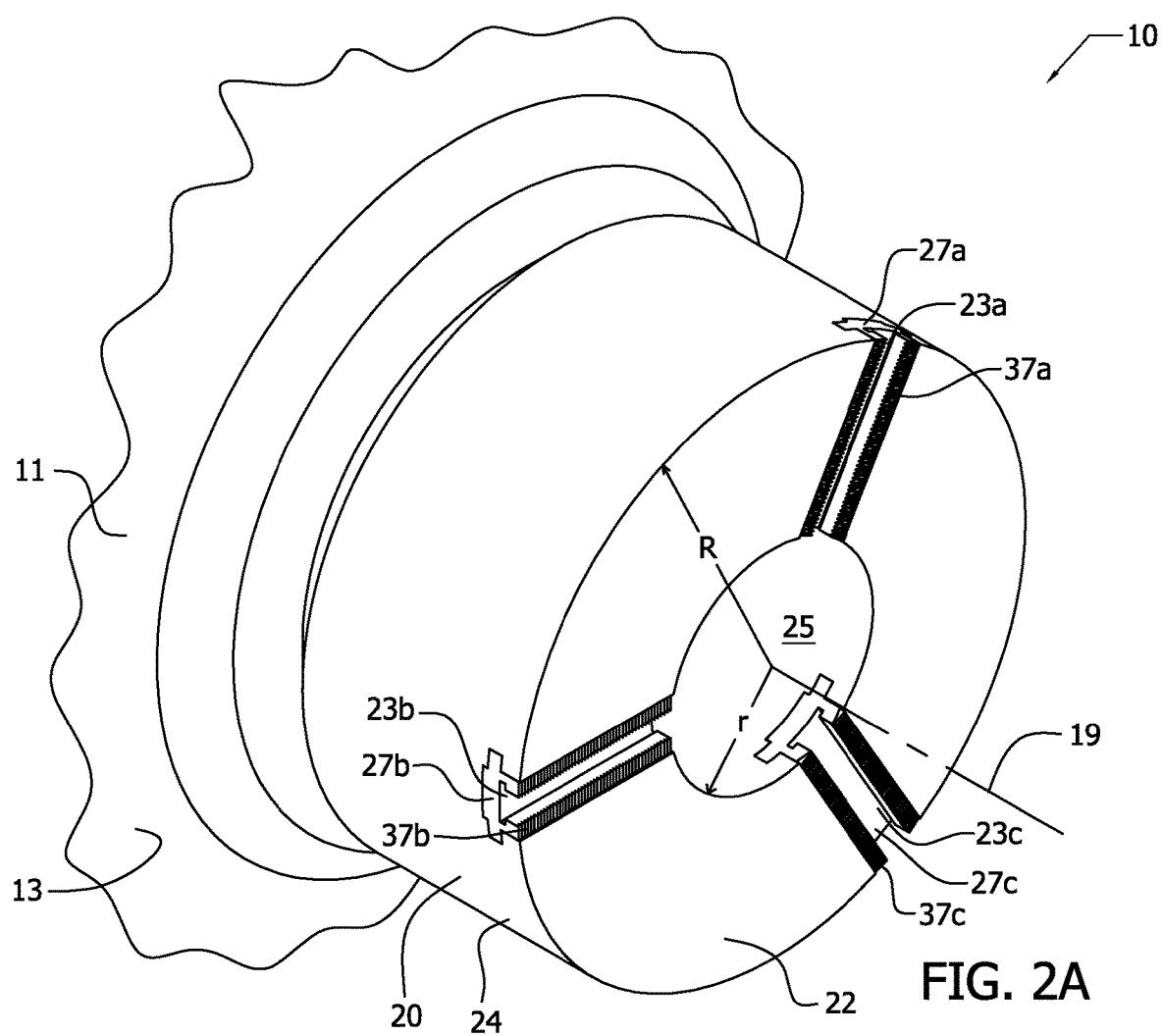
FIG. 2A illustrates by perspective view portions of the exemplary gauge apparatus of FIG. 1.

FIG. 1 illustrates exemplary gauge apparatus 10 including chuck 20 that extends forth from side 13 of CNC machine 11 and gauge assembly 40. As illustrated in FIG. 1 (also see FIGS. 2A, 2B, 2C, 2D), chuck 20 includes slot mechanisms 27a, 27b, 27c that form slots 23a, 23b, 23c, respectively. Slot mechanisms 27a, 27b, 27c with corresponding slots 23a, 23b, 23c are disposed radially about bore 25 in end face 22 of chuck 20, and chuck 20 rotates about axis 19, as illustrated. In this implementation, side face 24 of chuck 20 has constant radius R with respect to axis 19, as illustrated in FIG. 2A. In other implementations, a side face, such as side face 24, may be of varying radius along axis 19. Bore 25 has a cylindrical bore with constant bore radius r, as illustrated in FIG. 2A, but bore 25 may be otherwise configured in other implementations.

Figure 2B:
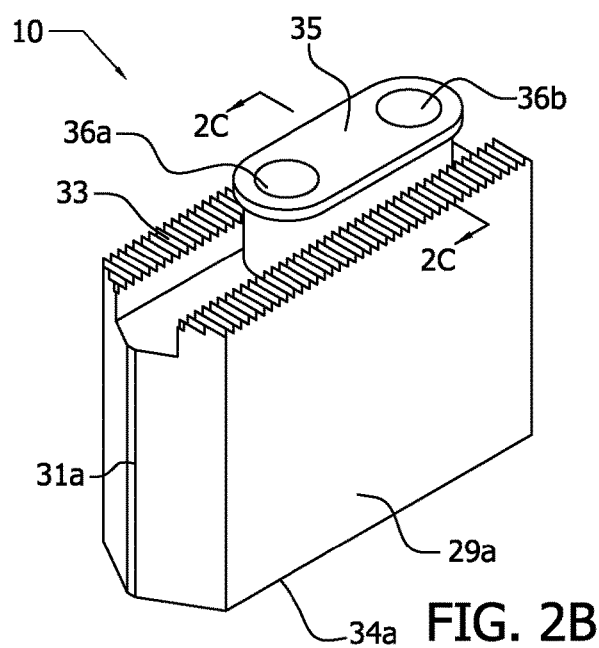
FIG. 2B illustrates by perspective view portions of the exemplary gauge apparatus of FIG. 1.
Figure 2C:
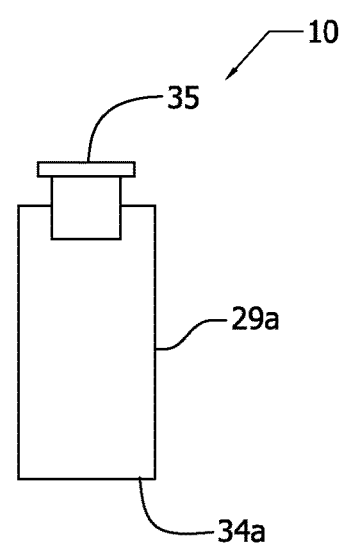
FIG. 2C illustrates by perspective view portions of the exemplary gauge apparatus of FIG. 1.
Figure 2D:
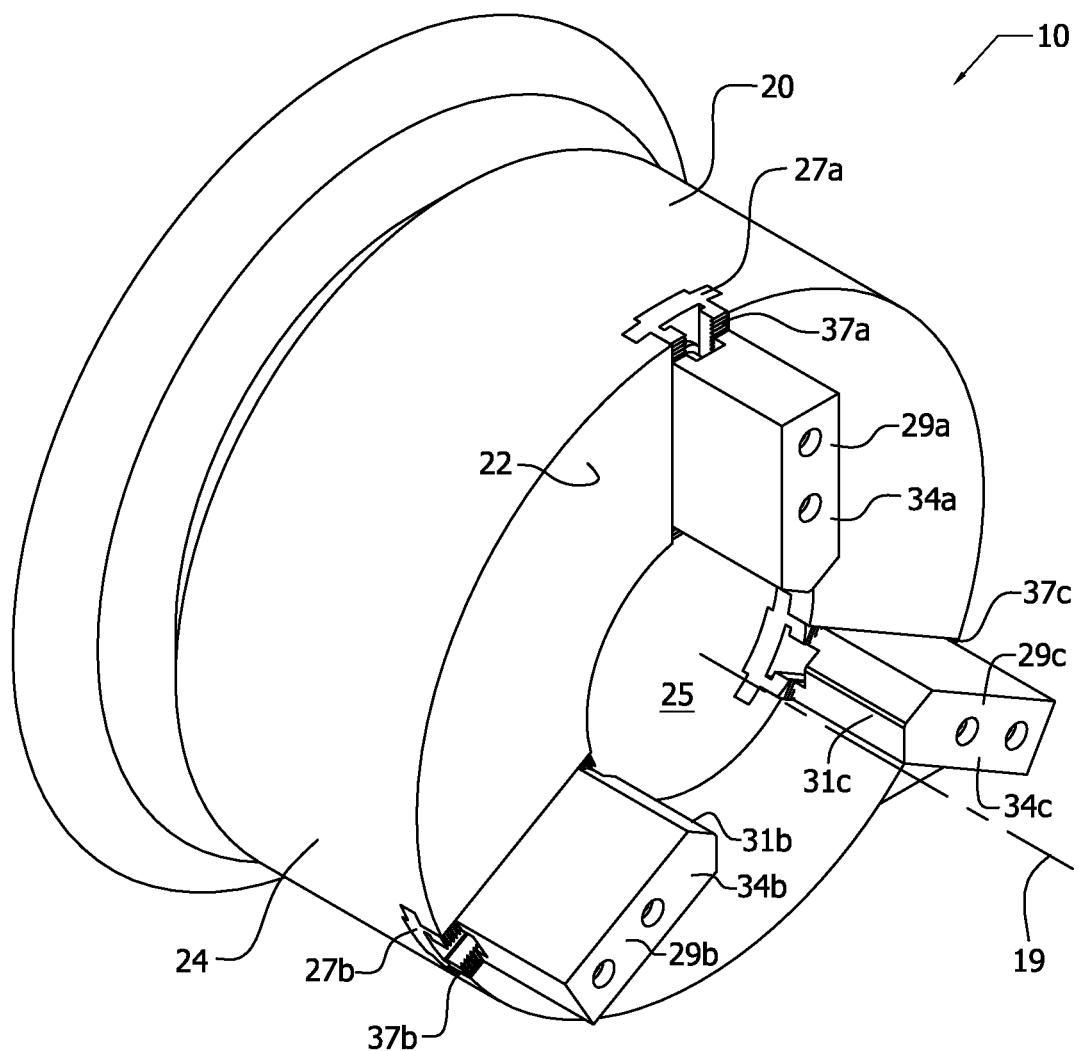
FIG. 2D illustrates by perspective view portions of the exemplary gauge apparatus of FIG. 1.

Jaws 29a, 29b, 29c are received in slots 23a, 23b, 23c of slot mechanisms 27a, 27b, 27c, respectively, as illustrated in FIGS. 2A, 2D. It should be understood that any number of slot mechanisms and corresponding jaws, such as slot mechanisms 27a, 27b, 27c and corresponding jaws 29a, 29b, 29c, may be included in a chuck, such as chuck 20, in various other implementations. As would be readily understood by those of ordinary skill in the art upon review of this disclosure, CNC machine 11 may include a lathe as well as various other machine tools including both computer numerically controlled machine tools and manually operated machine tools. Also, as would be readily understood by those of ordinary skill in the art upon review of this disclosure, slot mechanisms 27a, 27b, 27c may be hydraulicly or pneumatically actuated to displace radially in order to radially position tips 31a, 31b, 31c of jaws 29a, 29b, 29c, respectively, with respect to axis 19 to grip portions of a workpiece (not shown) inserted into bore 25 during the machining process or to release the workpiece from chuck 20. When portions of the workpiece are inserted into bore 25 and jaws 29a, 29b, 29c grip the workpiece, jaws 29a, 29b, 29c are arrayed circumferentially around bore 25 to center the workpiece about axis 19. Note that tips 31a, 31b, 31c of jaws 29a, 29b, 29c are configured to grip an outer surface of the workpiece in the exemplary implementations disclosed herein for purposes of explanation. It should be recognized that the apparatus and related methods disclosed herein may be applied to jaws configured to grip an inner surface of a workpiece (e.g., an inner surface of a tube), in various other implementations.

FIGS. 2B, 2C illustrated jaw 29a in further detail with jaws 29b, 29c being constructed similar to jaw 29a. As illustrated in FIG. 2B, tip 31a of jaw 29a is configured to engage an outer surface of the workpiece by being compressively biased against the outer surface of the workpiece. Detent 35 is slidably received in slot 23a of slot mechanism 27a. When jaw 29a is positioned in slot 23a, fasteners 36a, 36b of detent 35 are tightened to bias portions of detent 35 with portions of slot mechanism 27a, and teeth 33 engage with corresponding teeth 37a, 37b, 37c of slot mechanism 27a to secure jaw 29a to chuck 20. Jaw 29a may be either secured to or released from chuck 20 by tightening or loosening fasteners 36a, 36b, respectively, as would be readily understood by those of ordinary skill in the art upon study of this disclosure. FIG. 2C illustrates jaw 29a in cross-section to further elucidate detent 35. Back surfaces 34a, 34b, 34c of jaws 29a, 29b, 29c, respectively, which are opposite of the detent, such as detent 35, are illustrated in FIG. 2D.

As illustrated in FIG. 1, jaw 29a is in a process of being inserted into slot 23a of slot mechanism 27a of chuck 20 with jaw 29a partially slidably received in slot 23a of slot mechanism 27a. Gauge assembly 40 is being used to position jaw 29a within slot 23a, as illustrated in FIG. 1. Gauge assembly 40, as illustrated in FIG. 1, includes outer guide assembly 50 in slidable lockable releasable disposition with respect to gauge member 41 and inner guide assembly 60 in slidable lockable releasable disposition with respect to gauge member 41. Gauge member 41, as illustrated, is formed generally as an elongate member, and outer guide assembly 50 and inner guide assembly 60 may be traversed along gauge member 41 to be variously positioned along gauge member 41. Gauge assembly 40 including gauge member 41, outer guide assembly 50, and inner guide assembly 60 may be formed of various metals such as steel, aluminum and brass, various hard plastics, and combinations thereof, in various implementations.

Outer guide assembly 50 cooperates with side face 24 of chuck 20 to position gauge member 41 with respect to side face 24 and to orient gauge member 41 parallel to end face 22 of chuck and radially with respect to axis 19 along a slot, such as slot 23a, 23b, 23c.

Figure 3D:
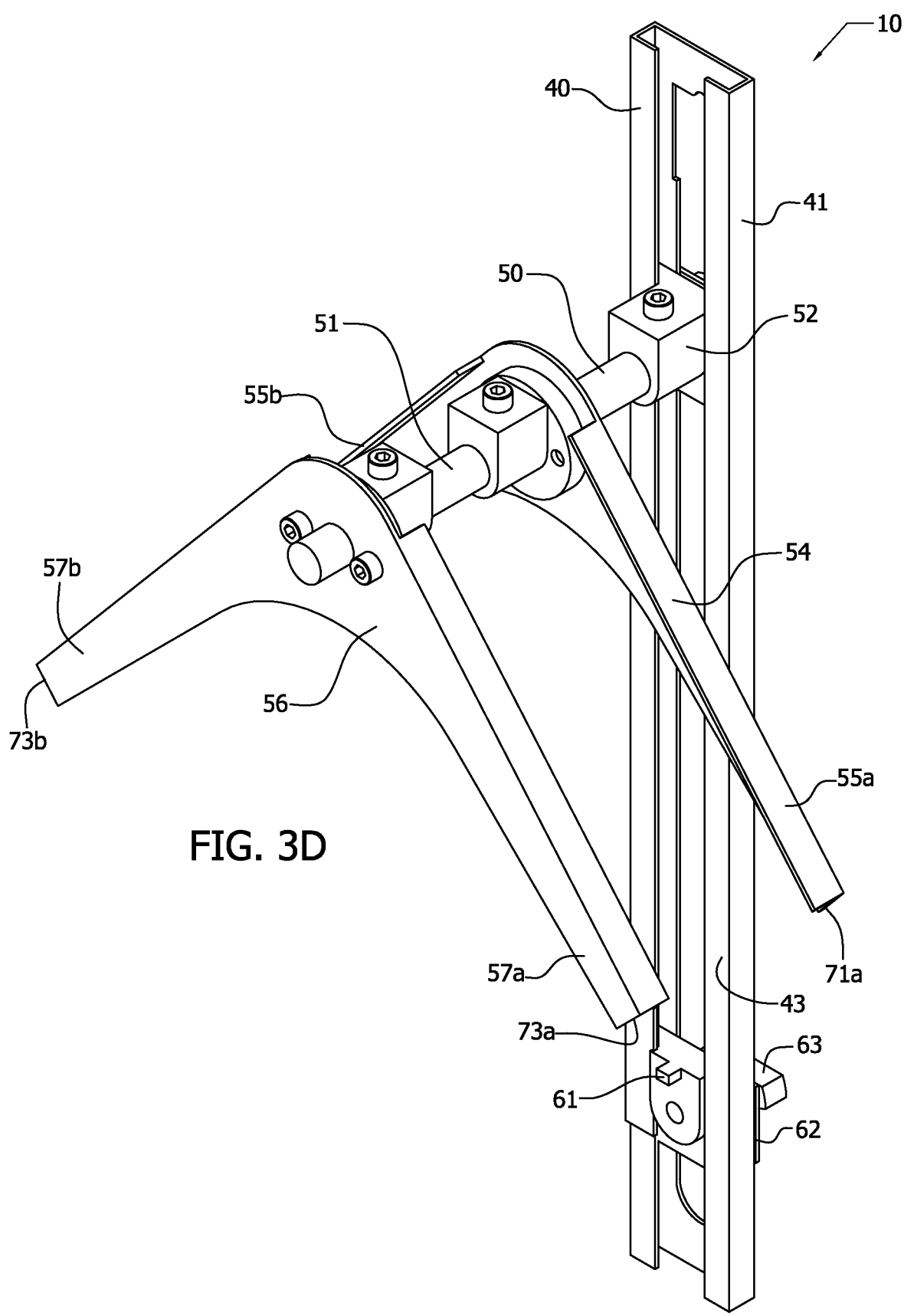
FIG. 3D illustrates by another perspective view the exemplary gauge assembly of FIG. 3A.
Figure 3E:
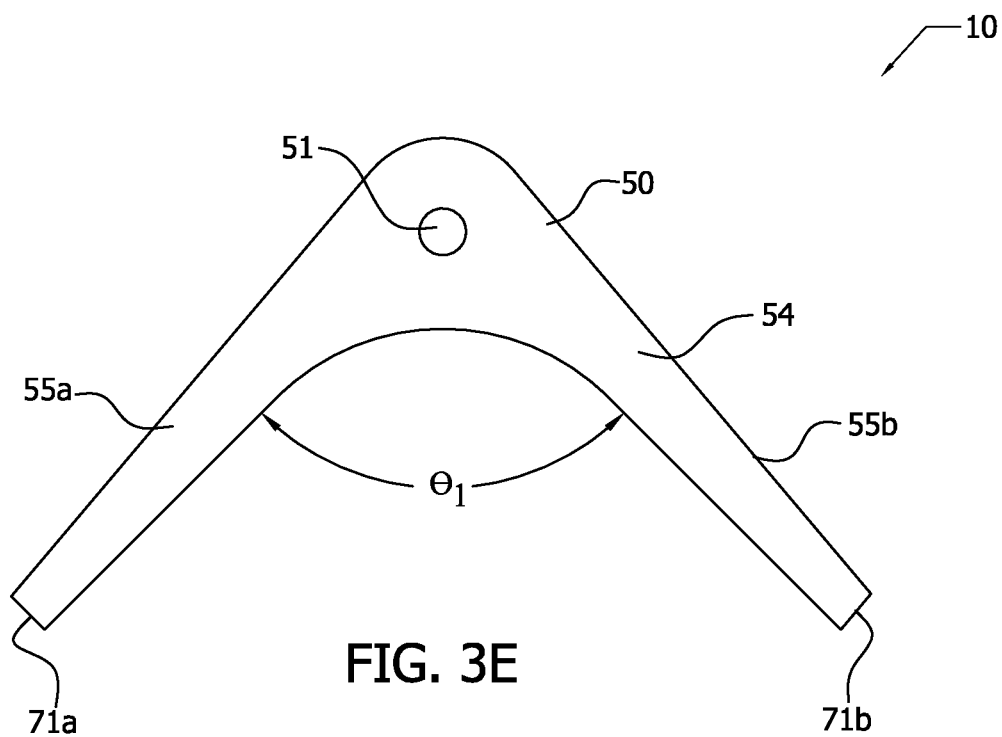
FIG. 3E illustrates by elevation view portions of the exemplary gauge assembly of FIG. 3A.
Figure 3F:
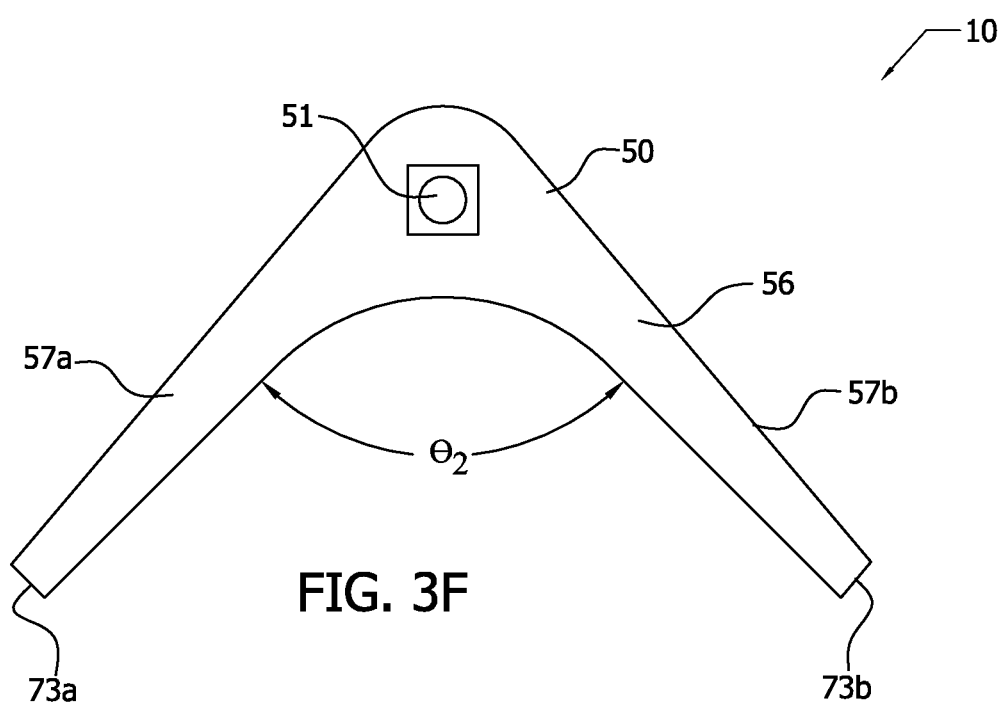
FIG. 3F illustrates by elevation view portions of the exemplary gauge assembly of FIG. 3A.

In this implementation, outer guide assembly 50 includes outer guide slider 52 slidably lockably releasably received by gauge member 41. Guide member 51 extends forth from outer guide slider 52 perpendicular to gauge member 41, and supports 54, 56 are disposed along guide member 51, in this implementation. Supports 54, 56 may be adjustably positionable along guide member 51 in some implementations, or may be fixed to guide member 51 in other implementations. Support 54 includes arms 55a, 55b that extend forth radially from guide member 51 in a "V" configuration with guide member 51 being at an apex of the "V" and arms 55a, 55b set at angle $\theta_1$ with respect to one another, as illustrated in FIG. 3E. Support 56 includes arms 57a, 57b that also extend forth radially from guide member 51 in a "V" configuration with guide member 51 being at an apex of the "V" and arms 57a, 57b set at angle $\theta_2$ with respect to one another, as illustrated in FIG. 3F. Arms 55a, 55b of support 54 and arms 57a, 57b of support 56 are being positioned to engage side face 24 of chuck 20, as illustrated in FIG. 1, with guide member 51 being positioned parallel to axis 19, arms 55a, 55b oriented circumferentially with one another on side face 24, and arms 57a, 57b oriented circumferentially with one another on side face 24. Lengths of arms 55a, 55b and angle θ₁ of support 54 and lengths of arms 57a, 57b and angle θ₂ of support 56 are selected to conform circumferentially to side face 24. While angle θ₁ and angle θ₂ are illustrated as being equal, angle θ₁ and angle θ₂ may differ in other implementations to accommodate various geometries of the side face of the chuck.

Inner guide assembly 60 cooperates with gauge member 41 to position pin 61 with respect to gauge member 41 and, thus, with respect to side face 24, in this implementation. Inner guide assembly 60 includes inner guide slider 62 slidably lockably releasably received by gauge member 41, and pin 61 extends forth from inner guide slider 62, in this implementation. Pin 61 is in biased engagement with tip 31a of jaw 29a and back surface 34a of jaw 29a is biased against guide surface 43 of gauge member 41, as illustrated in FIG. 1. Pin 61 and/or guide surface 43 of gauge member 41 may be magnetized to secure magnetically jaw 29a thereto. One or more magnets (not shown) may be disposed about gauge member 41 to secure magnetically gauge member 41 with jaw 29a, in other implementations.

Gauge assembly 40 is further illustrated in FIGS. 3A, 3B, 3C, 3D, 3E, 3F. In this implementation, outer guide slider 52 of outer guide assembly 50 is slidably lockably releasably received by gauge member 41. Outer guide slider 52 may be slidably traversed along gauge member 41 to be variously positioned with respect to gauge member 41 to position guide member 51 and supports 54, 56. Outer guide slider 52 may be positioned with respect to gauge member 41 as indicated by outer scale 58 inscribed on gauge member 41 and outer mark 59 inscribed on outer guide slider 52. The positioning of outer guide slider 52 may be selected based upon radius R of side face 24 of chuck 20. Outer guide slider 52 may be locked to or released from gauge member 41 by tightening or loosening of fasteners 76a, 76b, 76c, 76d, respectively, in this implementation.

In this implementation, inner guide slider 62 of inner guide assembly 60 is slidably lockably releasably received by gauge member 41, so that inner guide slider 62 may be slidably traversed along gauge member 41 to be variously positioned with respect to gauge member 41 in order to position pin 61. Inner guide slider 62 may be positioned with respect to gauge member 41 as indicated by inner scale 68 inscribed on gauge member 41 and inner mark 69 inscribed on inner guide slider 62. The positioning of inner guide slider 62 may be selected to position pin 61 in order to position a jaw, such as jaw 29a, 29b, 29c, at a selected radial position $r_j$ with respect to axis 19 when gauge assembly 40 is operably engaged with the jaw, chuck 20 and bore 25. Inner guide slider 62 may be locked to or released from engagement with gauge member 41 by tightening or loosening of slider detent 63, in this implementation.

Outer scale 58 and inner scale 68 cooperate with one another. The positioning of outer guide slider 52 based upon radius R of side face 24 using outer scale 58 ensures that inner scale 68 denotes selected radial position $r_j$ with respect to axis 19. The inner scale 68 gives radial position $r_j$ with respect to axis 19 when outer guide slider 52 is positioned based upon radius R of side face 24 using outer scale 58.

Figure 4:
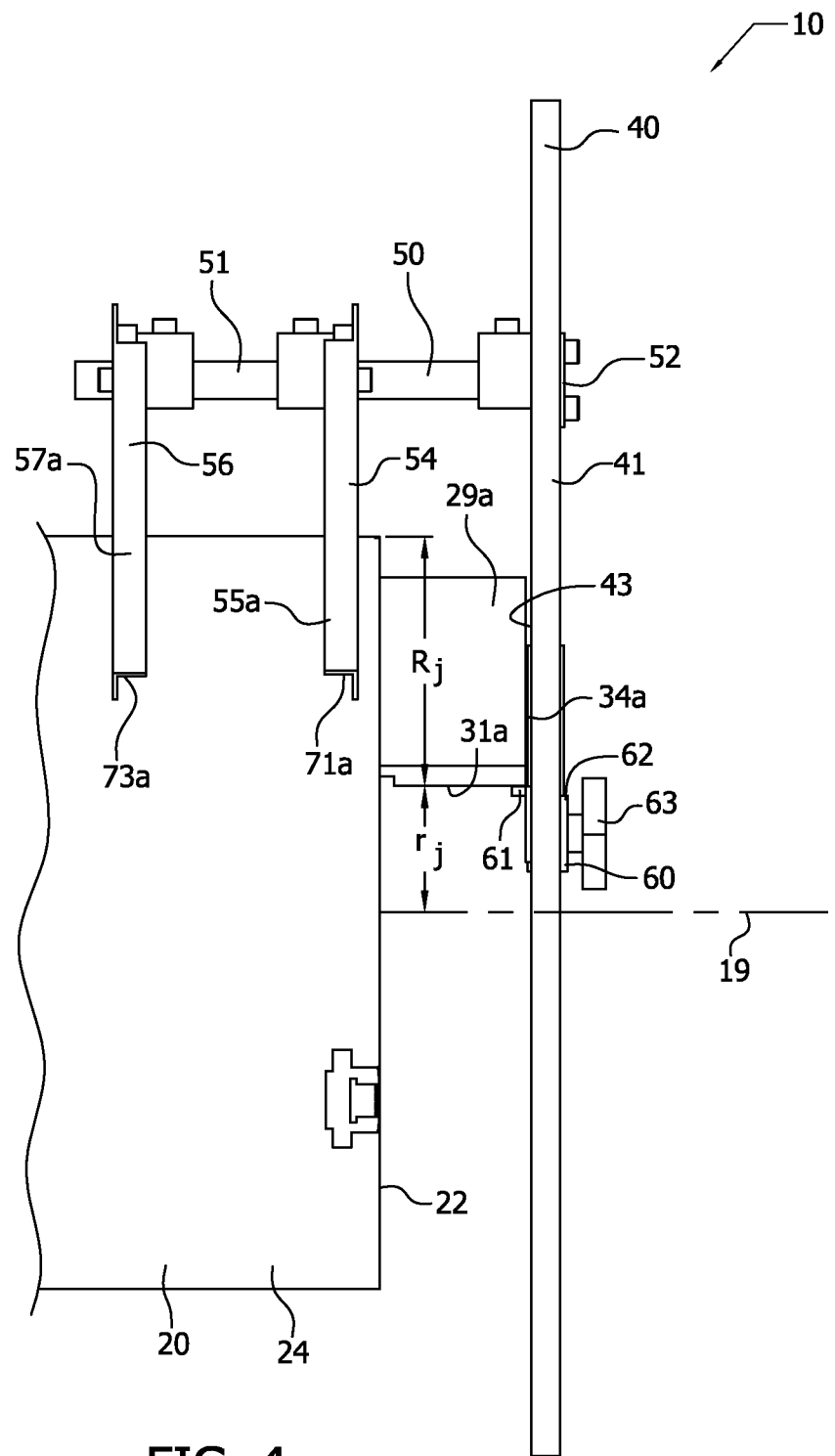
FIG. 4 illustrates by elevation view the exemplary implementation of the gauge apparatus of FIG. 1 in operation.

FIG. 4 illustrates gauge assembly 40 operably engaged with chuck 20 and jaw 29a to position tip 31a of jaw 29a at selected radial position $r_j$ with respect to axis 19 of chuck 20 by positioning tip 31a of jaw 29 at radial position $R_j$ with respect to side face 24 of chuck when jaw 29a is received in slot 23a of slot mechanism 27a. Outer guide assembly 50 and inner guide assembly 60 are positioned on gauge member 41 with respect to one another to position pin 61 radially with respect to side face 24 thereby positioning jaw 29a, which rests on pin 61, at radial position $R_j$ with respect to side face 24 and at selected radial position $r_j$ with respect to axis 19. Thus, tip 31a is positioned using radius R of chuck 20 as the reference. Note that $r_j=R-R_j$.

As illustrated, guide member 51 is parallel aligned with axis 19 and ends 71a, 71b of arms 55a, 55b, respectively, of support 54 and ends 73a, 73b of arms 57a, 57b, respectively, of support 56 (see FIG. 3D) are biased against side face 24 of chuck 20. Ends 71a, 71b are disposed along a circumference of chuck 20 as are ends 73a, 73b. Gauge member 41 is parallel to end face 22 of chuck and aligned parallel with slot 23a so that gauge member is radial to axis 19. Detent 35 of jaw 29a is received in slot 23a of slot mechanism 27a, back surface 34a of jaw 29a is biased against guide surface 43 of gauge member 41, and tip 31a of jaw 29a rests upon pin 61 of inner guide assembly 60 to position jaw 29a at selected radial position $r_j$ with respect to axis 19, as illustrated. With jaw 29a so positioned using gauge assembly 40, fasteners 36a, 36b of detent 35 may be tightened to secure jaw 29a at selected radial position $r_j$ with respect to axis 19.

Figure 5:
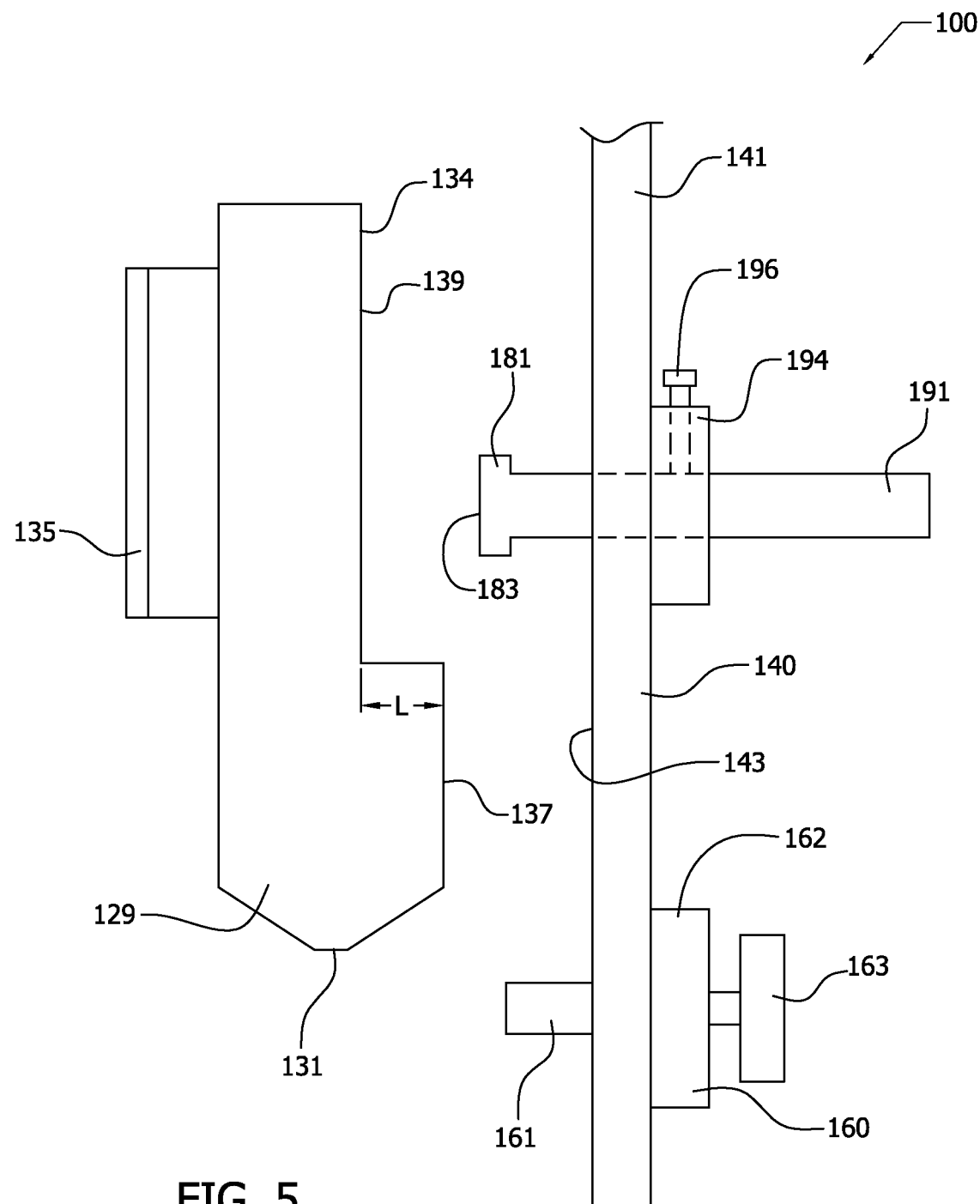
FIG. 5 illustrates by elevation view portions of another exemplary implementation of a gauge apparatus according to the present inventions; and, FIG. 6 illustrates by process flow chart an exemplary sequence of operations of an exemplary gauge apparatus to position a jaw at a selected radial position in a slot of a chuck.

FIG. 5 illustrates portions of exemplary gauge apparatus 100 including gauge assembly 140 in operable cooperation with jaw 129. Jaw 129 forms tip 131 that engages the workpiece, and jaw 129 includes detent 135 that may be slidably received in a slot mechanism such as slot mechanism 27a, 27b, 27c of gauge apparatus 10 and secured therein. In this implementation, back surface 134 of jaw 129 includes faces 137, 139 in a stepped configuration with offset L, as illustrated. Gauge assembly 140 includes spacer 181 connected to shaft 191. Shaft 191 cooperates with carriage 194, and carriage 194 cooperates with gauge member 141. Carriage 194 may be traversed along gauge member 141 to position spacer 181 for biased engagement of end 183 with face 139 of jaw 129. Shaft 191 may be extended or retracted and then held in position upon release or tightening of fastener 196 to position end 183 of spacer 181 with respect to guide surface 143 of gauge member 141 and with respect to face 139 in order to compensate for offset L. Thus, when jaw 129 is in operable cooperation with gauge assembly 140, face 137 biases against portions of guide surface 143 of gauge member 141, face 139 biases against end 183 of spacer 181 in order to align jaw 129 with gauge member 141, and tip 131 of jaw 129 rests upon pin 161, in this implementation. Pin 161 may be positioned with respect to gauge member 141 by traversal of inner guide slider 162 of inner guide assembly 160. Inner guide slider may be fixed with respect to or released to slide upon gauge member 141 by tightening or loosening of slider detent 163, respectively, in this implementation.

In operation of a gauge apparatus, such as gauge apparatus 10, 100, a user selects a selected radial position, such as selected radial position $r_j$, of a tip, such as tip 31a, 31b, 31c, 131, of a jaw, such as jaw 29a, 29b, 29c, 129, with respect to an axis, such as axis 19, of a chuck, such as chuck 20. The jaw is then positioned in the slot at the selected radial position with respect to the axis by the gauge apparatus using a radius, such as radius R, of a side face, such as side face 24, of the chuck as a reference.

The user positions a gauge member, such as gauge member 41, 141, of a gauge assembly, such as gauge assembly 40, 140 with respect to an outer guide assembly, such as outer guide slider 52 of outer guide assembly 50, based on a radius, such as radius R, of the outer face of the chuck. This ensures that the inner scale is positioned with the axis so that the pin is positioned properly with the axis as indicated by an inner scale and inner mark, such as inner scale 68 and inner mark 69.

The gauge member and the outer guide assembly may be positioned with respect to one another by positioning of an outer guide slider, such as outer guide slider 52. Positioning of the outer guide slider with respect to the gauge member positions a guide member, such as guide member 51, thereby positioning supports, such as supports 54, 56, received along the guide member with respect to the gauge member. The outer guide slider may be positioned with respect to the gauge member using an outer scale and outer mark, such as outer scale 58 and outer mark 59. The outer scale may indicate various radii, and the outer mark may be positioned with respect to the outer scale at the radius of the side face of the chuck as indicated by the scale.

The user positions a pin, such as pin 61, 161, with respect to the gauge member thereby positioning the pin with respect to the outer guide assembly and thence with the side face of the chuck. In order to position the pin with respect to the gauge member, the user positions an inner guide slider such as inner guide slider 62, 162, of an inner guide assembly, such as inner guide assembly 60, 160, with respect to the gauge member. The inner guide slider may be positioned using an inner scale and inner mark. The inner scale may indicate various radial positions with respect to the axis, and the inner mark may be positioned with respect to the inner scale at the selected radial position $r_j$ as indicated by the inner scale.

At least portions of a back surface, such as back surface 34a, 34b, 34c, 134, of the jaw is then biased against a guide surface, such as guide surface 43, 143, of the gauge member. In certain implementations, the guide surface may include a spacer, such as spacer 181, including other structures configured to bias against certain portions of the back surface of the jaw. The tip of the jaw is resting against the pin and the jaw is positioned between the pin and the guide member.

With the jaw thusly engaged with the gauge assembly, a detent, such as detent 35, 135, of the jaw may be inserted into a slot, such as slot 23a, 23b, 23c, of a slot mechanism, such as slot mechanism 27a, 27b, 27c. The jaw slides freely in the slot as ends of arms, such as ends 71a, 71b, 73a, 73b of arms 55a, 55b, 57a, 57b, respectively, of the supports, are biased against the side face of the chuck. The arms of each support are oriented circumferentially with respect to one another to bias circumferentially upon the side face and the guide member is aligned parallel with the axis so that the gauge member is aligned parallel to an end face, such as end face 22, of the chuck and radially with the axis. With the jaw in cooperation with the gauge assembly and the gauge assembly so aligned with the chuck, the jaw is then positioned at the selected radial position with respect to the axis using the radius of the chuck as the reference. Fasteners, such as fasteners 36a, 36b of detent 35 may then be tightened to secure the jaw at the selected radial position.

Figure 6:
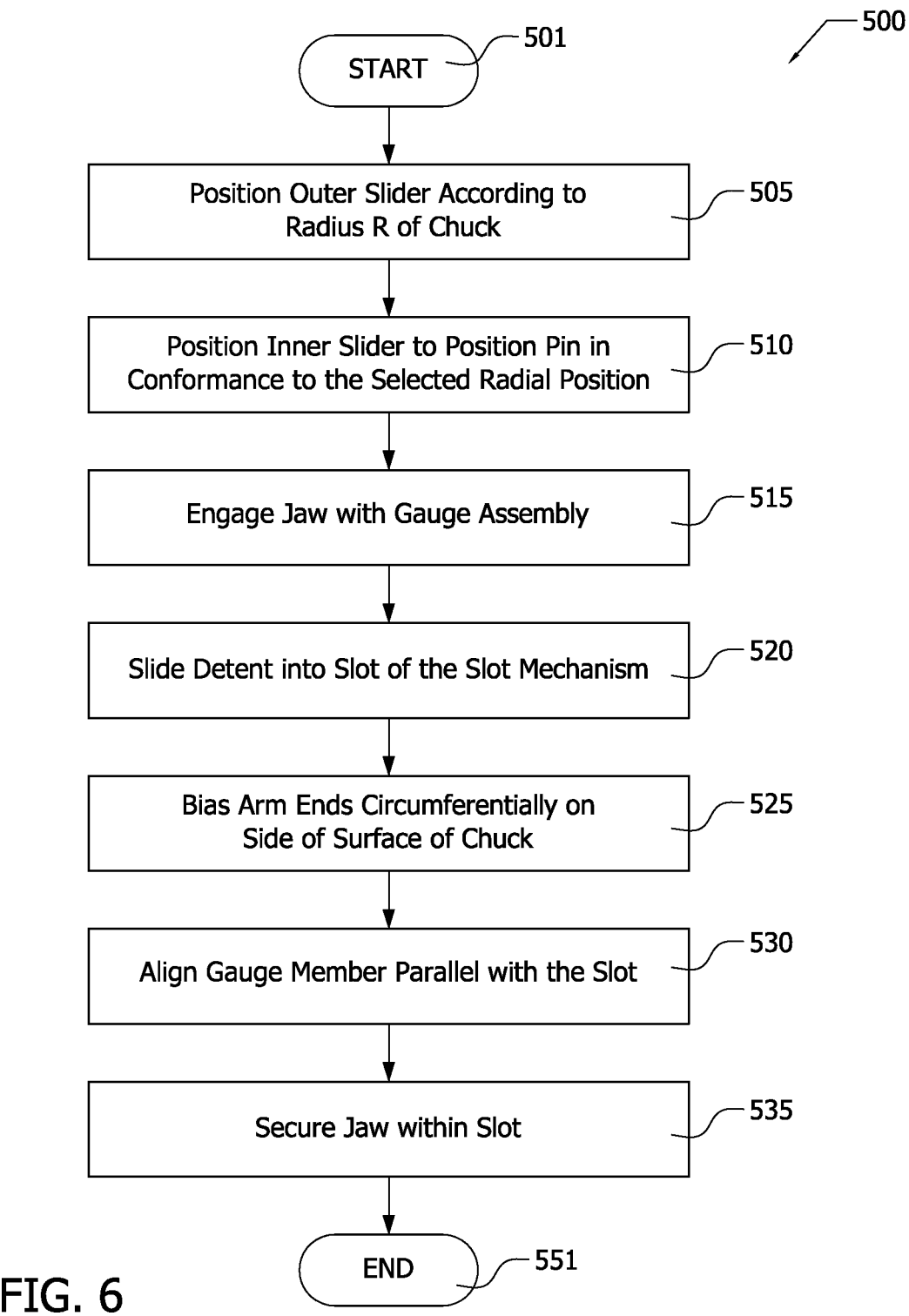

Exemplary method 500 illustrated in FIG. 6 describes an exemplary sequence of operations of the gauge apparatus. Method 500 is entered at step 501. At step 505, the outer slider is positioned with respect to the gauge member of the gauge assembly according to the radius R of the side face of the chuck. The associated scale and mark are used to position the outer slider.

At step 510, the inner slider is positioned with respect to the gauge member to position the pin in conformance to the selected radial position with respect to the axis. The associated scale and mark are used to position the inner slider.

At step 515, the jaw is engaged with the gauge assembly with the tip resting upon the pin and the back surface of the jaw biased against the guide surface of the gauge assembly.

At step 520, the detent of the jaw is slid into the slot of the slot mechanism. The jaw moves freely in the slot with the tip resting upon the pin.

At step 525, arm ends of the arms disposed on the guide member are biased circumferentially upon the side face of the chuck with the gauge member aligned parallel to the slot.

At step 530, the gauge member is aligned parallel with the slot.

At step 535, the jaw is then secured within the slot of the slot mechanism at the selected radial position.

Note that the jaw is maintained in relation with the gauge assembly so that the tip is resting upon the pin and the back surface is biased against the guide surface of the gauge assembly while performing steps 520, 525, 530, 535. Method 500 terminates at step 551.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72(b) only. Accordingly, the Abstract is not intended to identify key elements of the apparatus and methods disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A gauge apparatus, comprising:
   a gauge member having an elongate configuration with a guide surface against which a side of a jaw may be biased;
   a pin projecting forth from the gauge member to receive a tip of the jaw with the side of the jaw biased against the guide surface, the pin being positionable with respect to the gauge member; and
   an outer guide assembly in mechanical cooperation with the gauge member, the outer guide assembly cooperates with a side face of a chuck to orient the gauge member radially with an axis of the chuck to locate the pin radially with respect to the side face in order to position the jaw at a selected radial position with respect to the axis.

2. The apparatus of claim 1, further comprising:
   a scale disposed upon the gauge member; and
   a mark disposed upon the outer guide assembly that cooperates with the scale to position the gauge member with respect to the outer guide assembly based upon a radius of the side face of the chuck.

3. The apparatus of claim 1, further comprising:
   a scale disposed upon the gauge member; and
   a mark disposed upon the inner guide assembly that cooperates with the scale to position the pin with respect to the gauge member.

4. The apparatus of claim 1, further comprising:
   a spacer disposed upon the guide surface of the gauge member to bias against portions of the side of the jaw.

5. The apparatus of claim 1, wherein the jaw is magnetically engaged with the gauge member.

6. A gauge apparatus, comprising:
a gauge member having an elongate configuration with a guide surface against which a side of a jaw may be biased;
an inner guide assembly in mechanical cooperation with the gauge member to be positionable with respect to the gauge member;
a pin projecting forth from the inner guide assembly to receive a tip of the jaw with the side of the jaw biased against the guide surface, the pin being positionable with respect to the gauge member by positioning of the inner guide assembly; and
an outer guide assembly in mechanical cooperation with the gauge member, the outer guide assembly being positionable with respect to the gauge member, the outer guide assembly cooperates with a side face of a chuck and with the gauge member to position the tip of the jaw at a selected radial position with respect an axis of the chuck using a radius of the chuck as a reference, the jaw being received within a slot of the chuck and the tip of the jaw being received by the pin, the selected radial position being selected by positioning of the outer guide assembly and the inner guide assembly along the gauge member with respect to the radius of the chuck.

7. A method of positioning a jaw in a chuck using a gauge apparatus, comprising the steps of:
positioning an outer slider with respect to a gauge member of said gauge apparatus according to a radius R of a side face of said chuck;
positioning an inner slider with respect to the gauge member to position a pin in conformance to a selected radial position with respect to an axis of said chuck, the pin mechanically cooperating with the inner slider;
engaging said jaw with said gauge assembly with a tip of said jaw resting upon the pin and a back surface of said jaw biased against a guide surface of the gauge member;
receiving slidably a detent portion of said jaw within a slot of said chuck; and
biasing portions of a guide member upon the side face of said chuck with the gauge member aligned parallel to the slot thereby positioning the tip of said jaw at the selected radial position with respect to the axis of said chuck.

8. The method of claim 7, further comprising the step of:
securing said jaw to said chuck, the tip of said jaw being at the selected radial position with respect to the axis of said chuck.

* * * * *